United States Patent
Maruki et al.

[11] Patent Number: 5,934,126
[45] Date of Patent: Aug. 10, 1999

[54] INTERNALLY TOOTHED MEMBER AND METHOD AND APPARATUS FOR FORMING THE SAME

[75] Inventors: Michio Maruki; Osamu Fukukawa; Hideyuki Nagai; Noah Utsumi; Mitsuhiko Ando; Naoji Kato, all of Anjo, Japan

[73] Assignee: Aisin AW Co., Ltd., Anjo, Japan

[21] Appl. No.: 08/982,414

[22] Filed: Dec. 2, 1997

[30] Foreign Application Priority Data

Dec. 6, 1996 [JP] Japan .................................. 8-327186

[51] Int. Cl.⁶ ...................................................... B21H 5/02
[52] U.S. Cl. ........................... 72/85; 29/893.32; 192/70.2
[58] Field of Search .............................. 29/893.32; 72/68, 72/83, 84, 85, 110, 111, 96; 74/434; 192/70.2; 403/298, 359; 464/162

[56] References Cited

U.S. PATENT DOCUMENTS 5,384,949  1/1995  Wodrich et al. ....................... 192/70.2

FOREIGN PATENT DOCUMENTS

| 1-279120 | 11/1989 | Japan | ..................................... 403/359 |
| A-4-175576 | 6/1992 | Japan . | |
| A-5-76982 | 3/1993 | Japan . | |
| A-6-23461 | 2/1994 | Japan . | |
| A-7-265990 | 10/1995 | Japan . | |
| A-8-39180 | 2/1996 | Japan . | |
| A-8-300083 | 11/1996 | Japan . | |

Primary Examiner—Lowell A. Larson
Attorney, Agent, or Firm—Oliff & Berridge, PLC

[57] ABSTRACT

An internally toothed member is shown suitable for use as a clutch drum in an automatic transmission. The internally toothed member has the shape of a cup with an open end and a central axis. The cup-shaped member has first internal teeth extending in the axial direction and second internal teeth extending further toward the open end of the member than the first internal teeth. The internal teeth are each formed on an inner circumferential surface of the cup-shaped member in each of a plurality of locations spaced in the circumferential direction. Also, a groove for receiving a snap ring is formed in the second internal teeth closer to the open end than end faces of the first internal teeth facing the open end. Because the first and second internal teeth are formed projecting radially inward, they do not lower the rigidity of the internally toothed member. Also, because it is not necessary to fix a cylindrical member to the outside of the internally toothed member for reinforcement, working man-hours can be reduced and it is possible to lower the cost of the internally toothed member.

6 Claims, 11 Drawing Sheets

INTERNALLY TOOTHED MEMBER AND METHOD AND APPARATUS FOR FORMING THE SAME

BACKGROUND OF THE INVENTION

1. Field of Invention

This invention relates to an internally toothed member suitable for use, for example, as a drum of a clutch in an automatic transmission, and to a method and an apparatus for forming the same.

2. Related Art

In automatic transmissions, planetary gear units are used. A planetary gear unit is made up of a sun gear, pinion gears, a ring gear and a carrier. The planetary gear unit is constructed so that gear-changing can be effected by selectively controlling the sun gear, the ring gear and the carrier using frictional engagement elements such as clutches and brakes (see Japanese Unexamined Patent Publication No. H.4-175576).

Figure 2:
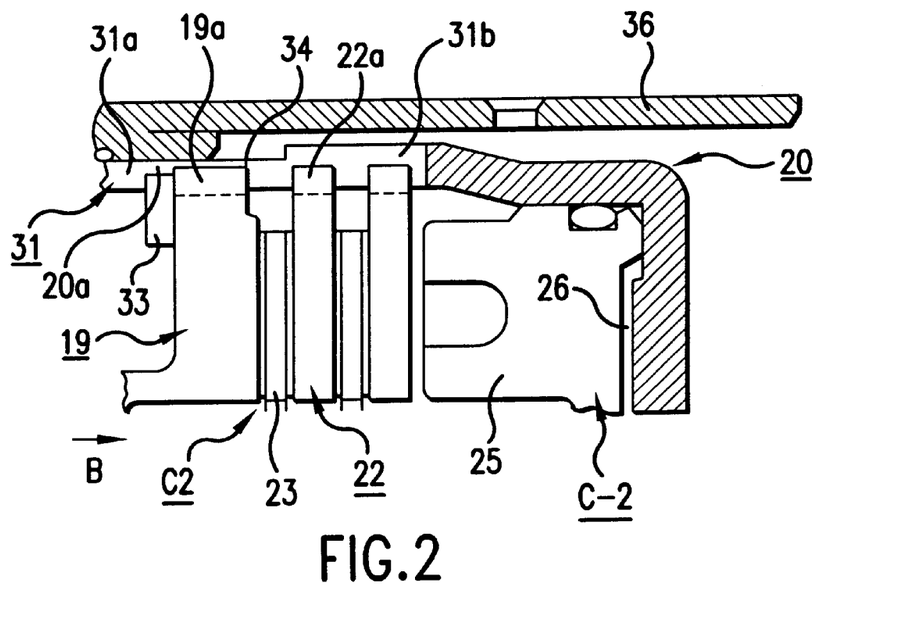
FIG. 2 is a sectional view of a main part of a conventional clutch.

FIG. 2 shows a section of a main part of a conventional clutch. In FIG. 2, C2 is a second clutch that can be engaged and disengaged, allowing an input shaft (not shown) and a sun gear (not shown) to be selectively coupled. For this purpose, the second clutch C2 includes a rotatably disposed drum 20, which is an internally toothed member, an inner side rotating member (not shown) mounted rotatably relative to the drum 20, a plurality of outer side thin plates 22 having their outer peripheries spline-interlocked with the drum 20, a plurality of inner side thin plates 23 having their inner peripheries spline-interlocked with the inner side rotating member, a flange 19 having its inner periphery spline-interlocked with the sun gear, and a hydraulic servo C-2 for engaging the second clutch C2 by pressing together the outer side thin plates 22 and the inner side thin plates 23.

To interlock the outer peripheries of the outer side thin plates 22 and the flange 19 with the drum 20, interlocking grooves 31 extending in the axial direction are formed in the drum 20 in a plurality of locations spaced in the circumferential direction, and a plurality of teeth 22a, 19a are formed projecting radially outward from the outer peripheries of the outer side thin plates 22 and the flange 19 in a plurality of locations spaced in the circumferential direction in correspondence with the interlocking grooves 31.

The hydraulic servo C-2 is mounted to advance and retract inside the drum 20 and has a piston 25 forming a hydraulic chamber 26 between itself and the drum 20. When the piston 25 is advanced (moved to the left in FIG. 2) by hydraulic fluid being supplied into the hydraulic chamber 26, the outer side thin plates 22 and the inner side thin plates 23 are pressed together and the second clutch C2 is thereby engaged. As a result, the input shaft and the sun gear are coupled and rotation transmitted from the input shaft to the inner side thin plates 23 by way of the inner side rotating member is transmitted to the outer side thin plates 22 and further transmitted by way of the drum 20 and the flange 19 to the sun gear.

When on the other hand the piston 25 is retracted (moved to the right in the figure) by hydraulic fluid being drained from the hydraulic chamber 26, the outer side thin plates 22 and the inner side thin plates 23 are moved apart and the second clutch C2 is released. As a result, the input shaft and the sun gear are disconnected and rotation transmitted to the inner side thin plates 23 by way of the inner side rotating member is not transmitted to the outer side thin plates 22.

When the outer side thin plates 22 and the inner side thin plates 23 are pressed together as the piston 25 advances, the flange 19 tends to be advanced together with the outer side thin plates 22 and the inner side thin plates 23. To limit movement of the flange 19 toward the left in FIG. 2 and exert a reaction force on the outer side thin plates 22, the inner side thin plates 23 and the flange 19, an annular snap ring 33 is provided at the inner circumferential surface of the drum 20. For this purpose, an annular groove 20a is formed adjacent to the flange 19 in the inner circumferential surface of the drum 20, and the snap ring 33 is fitted in this groove 20a. As a result, the front end face of the flange 19 (the left end face in FIG. 2) and the rear end face (the right end face in FIG. 2) of the snap ring 33 are made to abut upon each other and movement of the flange 19 to the left in the figure is thereby limited.

Also, the sun gear meshes with pinion gears (not shown), and it sometimes happens that a thrust force generated along with rotation of the sun gear acts on the flange 19 in the direction of the arrow B. At this time, if the flange 19 were to move to the right in FIG. 2 under this thrust force, the second clutch C2 would engage, notwithstanding that hydraulic fluid is not being supplied to the hydraulic chamber 26.

For this reason, to limit movement of the flange 19 to the right in FIG. 2 and exert a reaction force on the flange 19, interlocking grooves 31 are provided with wide parts 31a and narrow parts 31b. A step 34 is thereby formed adjacent to the flange 19. The teeth 19a of the flange 19 are inserted into the wide parts 31a of grooves 31, while the teeth 22a of the outer side thin plates 22 are inserted into the narrow parts 31b of grooves 31. As a result, the rear end face (the right end face in FIG. 2) of the flange 19 abuts on the step 34 and movement of the flange 19 to the right in FIG. 2 is thereby limited. The tooth width of the teeth 19a is made wider than the tooth width of the teeth 22a so that the teeth 19a can be inserted into the wide parts 31a and the teeth 22a can be inserted into the narrow parts 31b.

A first brake (not shown) for fixing the sun gear is disposed outward of the second clutch C2 in the axial direction. This first brake consists of a band brake. The band brake is applied by a belt (not shown) being tightened, thus stopping the rotation of drum 20 and the flange 19.

However, in the conventional drum described above, as rotation transmitted to the drum 20 is transmitted to the flange 19, stress acts at the root portions of the interlocking grooves 31, and the rigidity of the drum 20 is reduced.

For this reason, a cylindrical member 36 has been fixed by welding to the outer periphery of the drum 20 to increase the rigidity of the drum 20. However, the work of manufacturing the cylindrical member 36 and also the work of fixing the cylindrical member 36 by welding becomes necessary as a result, and the increased working man-hours raises the cost of the drum 20.

Furthermore, when fixing of the flange 19 is effected by means of two snap rings, because it is necessary to form two grooves for fitting the snap rings, working man-hours for cutting and deburring machining and so on increase the cost of the drum 20.

SUMMARY OF THE INVENTION

It is therefore an object of the invention to solve the problems associated with the conventional internally toothed member described above and provide an internally toothed member and a method and an apparatus for forming the same with which it is possible to increase the rigidity of the internally toothed member and reduce the number of working man-hours and the cost for producing the internally toothed member.

To achieve this object and other objects, an internally toothed member provided by the invention has the shape of a cup with an open end and a closed end and inner and outer circumferential surfaces. The internally toothed member has a plurality of first internal teeth extending in the axial direction and a plurality of axially extending second internal teeth interspaced between the first internal teeth and projecting further toward the open end of the member than the first internal teeth, with the teeth being formed on the inner circumferential surface of the member in a plurality of circumferentially spaced locations.

Also, an annular groove for fitting a snap ring is formed in the second internal teeth closer to the open end of the member than the ends of the first internal teeth that face the open end.

In another internally toothed member according to the invention, a braking surface for application of a band brake is formed on the outer circumferential surface of the internally toothed member.

In a method for forming an internally toothed member according to the invention, a blank is fixed to the end of a mandrel and while the mandrel is rotated the blank is pushed onto a tooth die part of the mandrel by forming rollers and thereby deformed into a cup shape.

Also, the first internal teeth extending in the axial direction and the second internal teeth projecting further toward the open end than the first internal teeth are each formed on the inner circumferential surface of the cup-shaped blank in a plurality of circumferentially spaced locations. An annular groove for fitting a snap ring is formed in the second internal teeth on the open end side of the ends of the first internal teeth.

An apparatus for forming the internally toothed member according to the invention includes a mandrel, fixing means for fixing a blank to the end of the mandrel, and forming rollers for deforming a blank into the shape of a cup by pushing the blank onto a tooth die part of the mandrel.

The tooth die part of the mandrel includes a plurality of concavities corresponding to the first internal teeth extending in the axial direction and a plurality of concavities corresponding to the second internal teeth projecting further toward the open end of the member than the ends of the first internal teeth. The concavities are provided in the mandrel at a plurality of circumferentially spaced locations corresponding to the desired locations for the teeth on the inner circumferential surface of the cup-shaped blank.

BRIEF DESCRIPTION OF THE DRAWINGS

The invention will be described in conjunction with the following drawings in which like elements are referred to with like reference characters, and in which.

DETAILED DESCRIPTION OF THE PREFERRED EMBODIMENTS

Preferred embodiments of the invention will now be described in detail with reference to the accompanying drawings.

Figure 3:
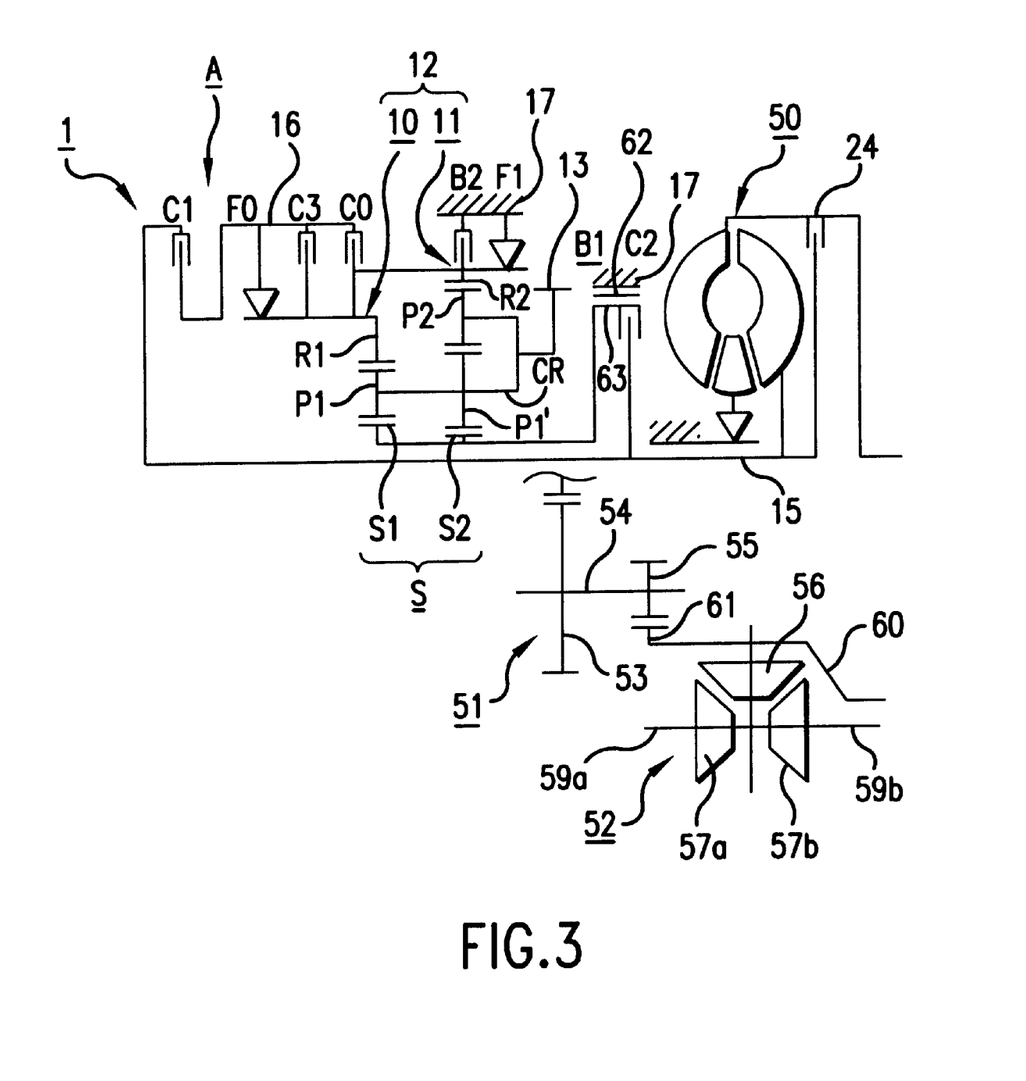
FIG. 3 is a schematic drawing of an automatic transmission including the first preferred embodiment of the present invention.

FIG. 3 is a schematic drawing showing an automatic transmission including a first preferred embodiment of the invention.

In FIG. 3, A denotes an automatic transmission. Automatic transmission A includes a torque converter 50, a lockup clutch 24, a four-speed gear mechanism 1, a speed-reducing mechanism 51 and a differential unit 52.

The four-speed gear mechanism 1 includes a planetary gear unit 12 made up of a single planetary gear 10 connected to a dual planetary gear 11. The single planetary gear 10 is made up of a sun gear S1, a pinion gear P1 and a ring gear R1. The dual planetary gear 11 is made up of a sun gear S2, pinion gears P1' and P2 and a ring gear R2. The sun gears S1, S2 form an integral sun gear S. The pinion gears P1, P1' meshing with the sun gears S1, S2 and the pinion gear P2 meshing with the ring gear R2 are all supported by a common carrier CR.

An input shaft 15 coupled to the output side of the torque converter 50 is connected by way of a first clutch C1 to a coupling member 16, and by way of a second clutch C2 to the integral sun gear S. A third clutch C3 and a second one-way clutch F0 are disposed in parallel with each other between the coupling member 16 and the ring gear R1, and a fourth clutch C0 is disposed between the coupling member 16 and the ring gear R2.

A first brake B1 has a band 62, and a drum 63 disposed on the inner side of the band 62 is connected to the integral sun gear S. A second brake B2 and a first one-way clutch F1 are disposed in parallel with each other between the ring gear R2 and a transmission case 17.

The carrier CR is connected to an output gear 13 positioned in the approximate center of the four-speed gear mechanism 1.

The speed-reducing mechanism 51 has a counter shaft 54 supported rotatably with respect to the transmission case 17. A large gear 53 and a small gear 55 are fixed to the counter shaft 54, and the large gear 53 meshes with the output gear 13 while the small gear 55 meshes with a ring gear 61 of the differential unit 52.

The differential unit 52 is made up of a differential carrier 60, a differential pinion 56 rotatably mounted on the differential carrier 60, and side gears 57a, 57b meshing with the differential pinion 56 on the left and right respectively. The ring gear 61 is fixed to the differential carrier 60, and front axles 59a, 59b are fixed to the side gears 57a, 57b respectively. The front axles 59a, 59b are respectively connected to left and right driving wheels (not shown).

The operation of the automatic transmission A will now be described.

In the automatic transmission A of the construction described above, in first gear, the first clutch C1 and the third clutch C3 are engaged and the first one-way clutch F1 and the second one-way clutch F0 are locked.

At this time, rotation of the input shaft 15 is transmitted by way of the first clutch C1 and the second one-way clutch F0 to the ring gear R1, but because rotation of the ring gear R2 is prevented by the first one-way clutch F1, the integral sun gear S is rotated and the rotation of the carrier CR is greatly reduced in speed. This speed-reduced rotation of the carrier CR is outputted through the output gear 13 as first gear rotation.

The rotation outputted through the output gear 13 is further reduced in speed by the speed-reducing mechanism 51 and transmitted by way of the differential unit 52 to the front axles 59a, 59b.

In second gear, the first clutch C1, the third clutch C3 and the first brake B1 are engaged and the second one-way clutch F0 is locked.

At this time, rotation of the input shaft 15 is transmitted by way of the first clutch C1, the second one-way clutch F0 and the third clutch C3 to the ring gear R1, but because rotation of the integral sun gear S is prevented by the first brake B1, the ring gear R2 is made to idle and the rotation of the carrier CR is reduced in speed. This speed-reduced rotation of the carrier CR is outputted through the output gear 13 as second gear rotation.

In third gear, the first clutch C1, the third clutch C3 and the fourth clutch C0 are engaged and the second one-way clutch F0 is locked.

At this time, rotation of the input shaft 15 is transmitted by way of the second one-way clutch F0 and the third clutch C3 to the ring gear R1 and is also transmitted by way of the fourth clutch C0 to the ring gear R2. Consequently, the entire planetary gear unit 12 rotates integrally, and rotation of the same speed as the engine speed is outputted through the carrier CR as third gear rotation.

In fourth gear, the first clutch C1, the fourth clutch C0 and the first brake B1 are engaged.

At this time, rotation of the input shaft 15 is transmitted by way of the first clutch C1 and the fourth clutch C0 to the ring gear R2, but because rotation of the integral sun gear S is prevented by the first brake B1, the rotation of the ring gear R2 greatly increases in speed the rotation of the carrier CR while causing the ring gear R1 to idle. This speed-increased rotation of the carrier CR is outputted through the output gear 13 as fourth gear rotation.

The second clutch C2 will now be described.

Figure 1:
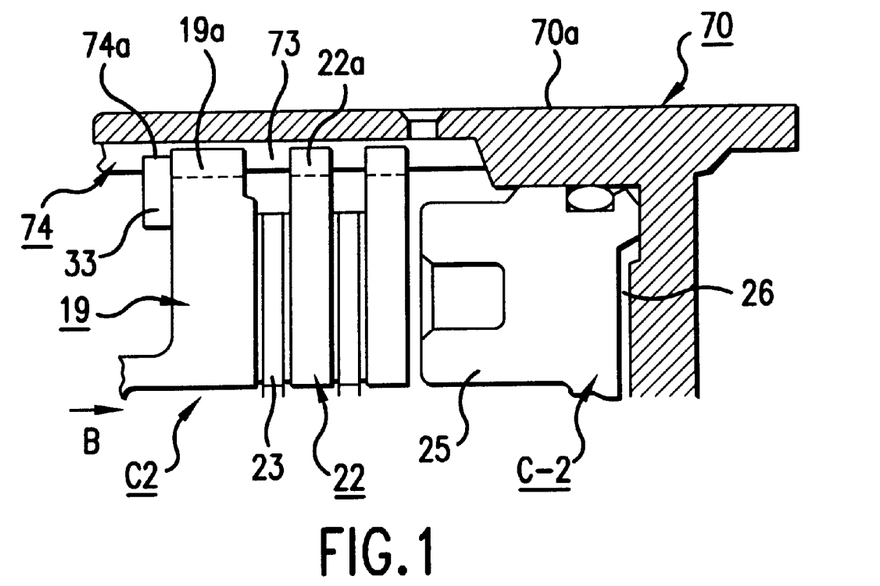
FIG. 1 is a sectional view of a main part of a second clutch in a first preferred embodiment of the invention.
Figure 4:
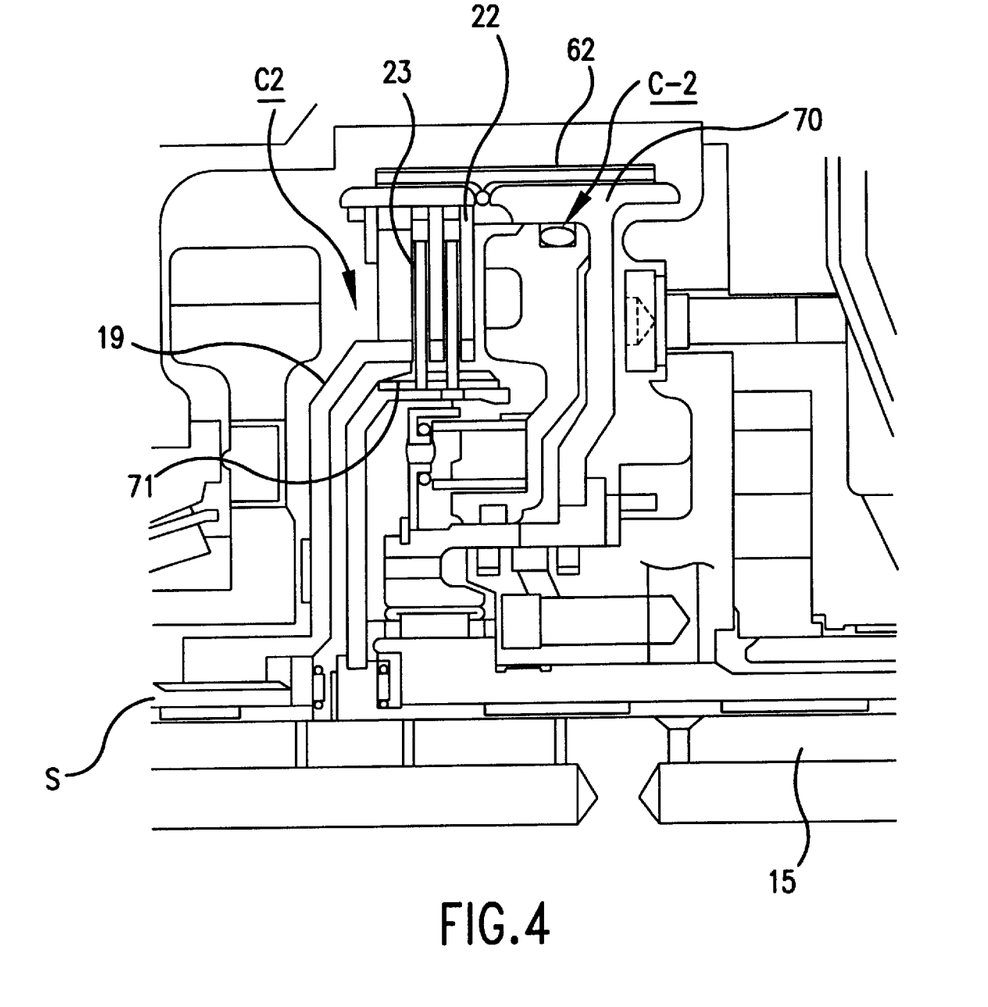
FIG. 4 is a sectional view showing how the second clutch is disposed in the first preferred embodiment.
Figure 5:
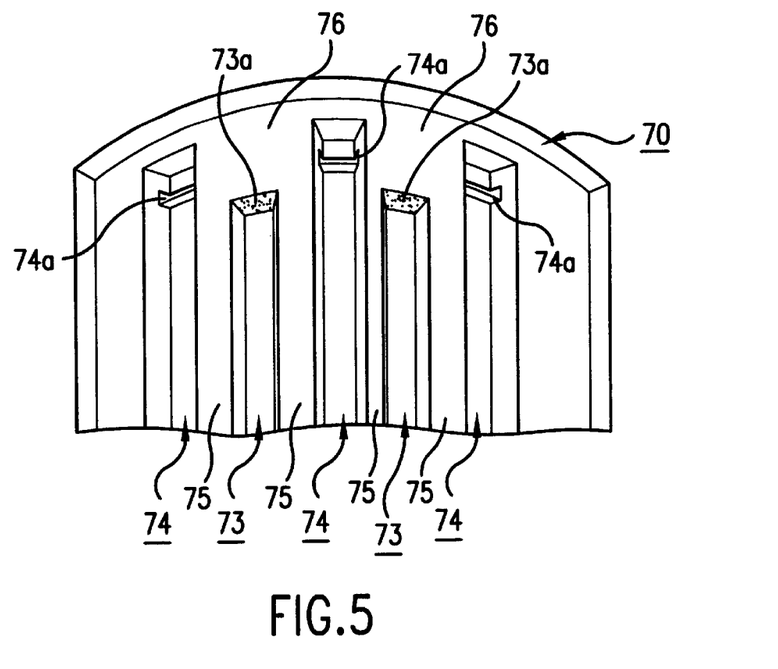
FIG. 5 is a perspective view of an internally toothed drum according to the first preferred embodiment.
Figure 6:
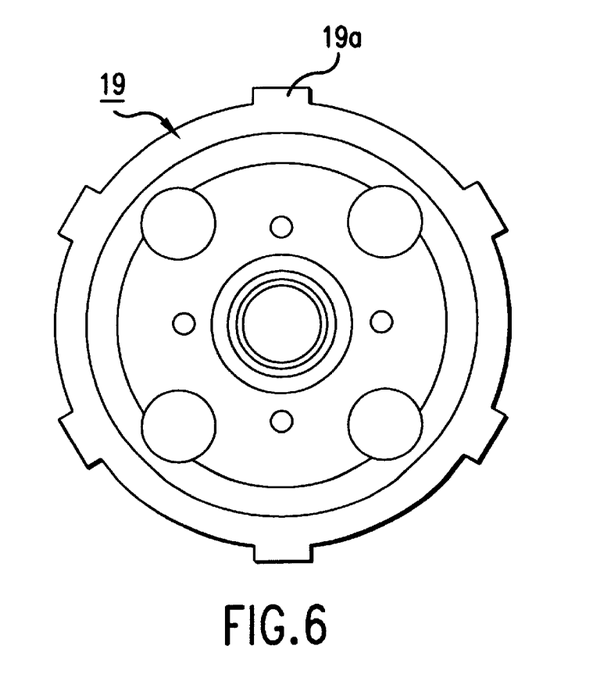
FIG. 6 is a front elevation view of a flange in the first preferred embodiment.

FIG. 1 is a sectional view showing a main part of the second clutch in the first preferred embodiment of the invention described above. FIG. 4 shows how the second clutch is disposed in the first preferred embodiment. FIG. 5 is a perspective view of an internally toothed drum according to the first preferred embodiment of the invention. FIG. 6 is a front view of a flange in the first preferred embodiment.

In the figures, C2 denotes the second clutch, and by this second clutch C2 being engaged the input shaft 15 and the sun gear S can be selectively coupled. For this purpose, the second clutch C2 has a cup-shaped, rotatably mounted drum 70, which is an internally toothed member, an inner side rotating member 71 mounted rotatably relative to the drum 70, a plurality of outer side thin plates 22 having their outer peripheries spline-interlocked with the drum 70, a plurality of inner side thin plates 23 having their inner peripheries spline-interlocked with the inner side rotating member 71, a flange 19 having its outer periphery spline-interlocked with the drum 70 and having its inner periphery spline-interlocked with the sun gear S, and a hydraulic servo C-2 for engaging the second clutch C2 by pressing together the outer side thin plates 22 and the inner side thin plates 23.

On the inner circumferential surface of the drum 70 in a plurality of locations spaced in the circumferential direction are integrally formed, axially extending first spline teeth 73. First spline teeth 73 interlock the outer peripheries of the outer side thin plates 22 with the drum 70. Interspaced between these first spline teeth 73, second axially extending spline teeth 74 project further toward the open end of the drum than the ends 73a of the first spline teeth 73. Second spline teeth 74 interlock the outer periphery of the flange 19 with the drum 70. Spline grooves 75 are formed between the first spline teeth 73 and the second spline teeth 74.

The first spline teeth 73 are shorter than the second spline teeth 74, and second spline grooves 76 are formed between the second spline teeth 74 where the first spline teeth 73 are not formed.

The outer peripheries of the outer side thin plates 22 are provided with a plurality of teeth 22a projecting radially outward in a plurality of circumferentially spaced locations. The teeth 22a are formed in correspondence with the first spline grooves 75, and these teeth 22a mesh with the first spline teeth 73.

The outer periphery of the flange 19 is provided with a plurality of teeth 19a projecting radially outward in a plurality of circumferentially spaced locations. The teeth 19a are formed in correspondence with the second spline grooves 76, and these teeth 19a mesh with the second spline teeth 74.

The teeth 19a and the second spline grooves 76, and the teeth 22a and the first spline grooves 75 do not necessarily have to be equal in number. It is also possible to make the teeth 22a, 19a smaller than the first and second spline grooves 75, 76.

The hydraulic servo C-2 is mounted to advance and retract inside the drum 70, and has a piston 25 forming a hydraulic chamber 26 between itself and the drum 70. When the piston 25 is advanced (moved to the left in FIG. 1) by hydraulic fluid being supplied into the hydraulic chamber 26, the outer side thin plates 22 and the inner side thin plates 23 are pressed together and the second clutch C2 is thereby engaged. As a result, the input shaft 15 and the sun gear S are coupled and rotation transmitted from the input shaft 15 to the inner side thin plates 23 by way of the inner side rotating member 71 is transmitted to the outer side thin plates 22 and further transmitted by way of the drum 70 and the flange 19 to the sun gear S.

When on the other hand the piston 25 is retracted (moved to the right in FIG. 1) by hydraulic fluid being drained from the hydraulic chamber 26, the outer side thin plates 22 and the inner side thin plates 23 are moved apart and the second clutch C2 is released. As a result, the input shaft 15 and the sun gear S are disconnected and rotation transmitted to the inner side thin plates 23 by way of the inner side rotating member 71 is not transmitted to the outer side thin plates 22.

When the outer side thin plates 22 and the inner side thin plates 23 are pressed together as the piston 25 advances, the flange 19 tends to be advanced together with the outer side thin plates 22 and the inner side thin plates 23. To limit movement of the flange 19 toward the left in FIG. 1 and exert a reaction force on the outer side thin plates 22, the inner side thin plates 23 and the flange 19, an annular snap ring 33 is provided around the inner circumference of the drum 70. For this purpose, a groove 74a extending in the circumferential direction is formed adjacent to the flange 19 in the inner circumferential surfaces of the second spline teeth 74 closer to the open end of the drum than the ends 73a of the first spline teeth 73. A snap ring 33 is fitted in this groove 74a. As a result, one face of the flange 19, namely the front end face (the left end face in FIG. 1) and the rear end face (the right end face in FIG. 1) of the snap ring 33 are made to abut upon each other and movement of the flange 19 to the left in FIG. 1 is thereby limited.

Also, the sun gear S meshes with pinion gears (not shown), and it sometimes happens that a thrust force generated along with rotation of the sun gear S acts on the flange 19 in the direction of the arrow B. At this time, if the flange 19 were to move to the right in FIG. 1 under this thrust force, the second clutch C2 would engage notwithstanding that hydraulic fluid is not being supplied to the hydraulic chamber 26.

For this reason, to limit movement of the flange 19 to the right in FIG. 1 and exert a reaction force on the flange 19, as described above, the first spline teeth 73 are made shorter than the second spline teeth 74. The rear end face (the right end face in FIG. 1) of the flange 19 and the end faces 73a of the first spline teeth 73 (their left end faces in FIG. 1) are made to abut upon each other. Therefore, movement of the flange 19 to the right in FIG. 1 is limited.

A first brake B1 (FIG. 3), which is a band brake for fixing the sun gear S, is disposed outward of the second clutch C2 in the axial direction. The first brake B1 has a band 62, which is applied by a belt being tightened, and stops the rotation of the drum 70 and the flange 19.

For this purpose, the outer circumferential surface of the drum 70 is cut or ground to form a braking surface 70a. The first brake B1 is applied to the outer circumferential braking surface 70a.

Thus, the front end face of the flange 19 and the rear end face of the snap ring 33 are made to abut such that movement of the flange 19 to the left in FIG. 1 is thereby limited. The rear end face of the flange 19 and the end faces 73a of the first spline teeth 73 are made to abut such that movement of the flange 19 to the right in FIG. 1 is also limited.

Therefore, just disposing a snap ring 33 on the front end face side of the flange 19 is sufficient, and it is not necessary to dispose a snap ring on the rear end face side of the flange 19. Consequently, it is only necessary to form the groove for the snap ring 33 in the inner circumferential surfaces of the second spline teeth 74. As a result the number of parts is reduced and the manufacturing man-hours and cost for the drum 70 are reduced.

Also, because movement of the flange 19 to the right in FIG. 1 is limited by the end faces of the first spline teeth 73 formed projecting radially inward, the rigidity of the drum 70 is not decreased. Furthermore, because the groove 74a is formed in the second spline teeth 74 formed projecting radially inward, the rigidity of the drum 70 is not decreased by this groove 74a either.

Moreover, because it is not necessary to fix a cylindrical member 36 (see FIG. 2) to the outside of the drum 70 for reinforcement, it is possible to reduce working man-hours and lower the cost of the drum 70 still further.

An apparatus for forming the drum 70 described above will now be described.

Figure 7:
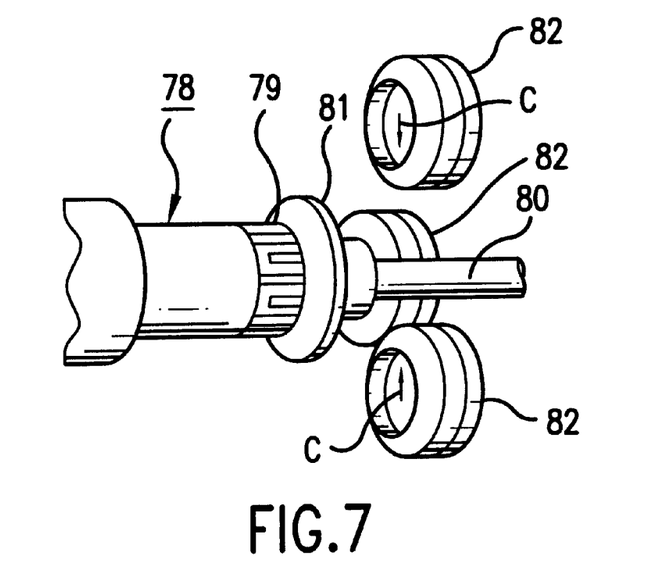
FIG. 7 is a perspective view of an apparatus for forming the drum in the first preferred embodiment before a blank has been formed.
Figure 8:
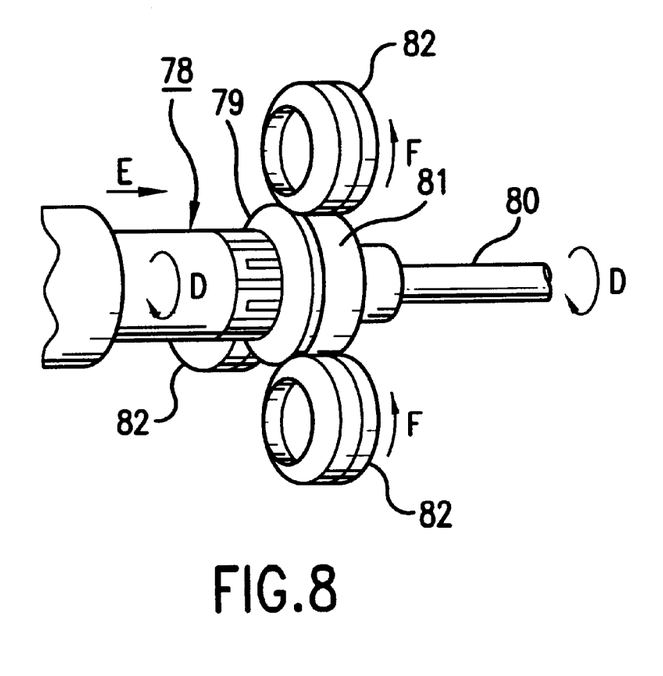
FIG. 8 is a perspective view of the apparatus of FIG. 7, after the forming of the blank has begun.

FIGS. 7 and 8 show an apparatus for forming the drum in the first preferred embodiment of the invention described above.

A rotatably supported cylindrical mandrel 78 includes a tooth die part 79 that is formed in a predetermined position on the mandrel 78. The tooth die part 79 includes concavities (represented by the axially extending lines at one end of mandrel 78) with shapes corresponding to the first and second spline teeth 73, 74 of the drum 70 (FIG. 5), projections (not shown) with shapes corresponding to the first and second spline grooves 75, 76, and projections (not shown) with shapes corresponding to the grooves 74a in the second spline teeth 74. A tail stock 80, which is provided as fixing means for retaining a blank in position against mandrel 78, is rotatably disposed facing the mandrel 78. An annular blank or work piece 81 is strongly clamped by the mandrel 78 and the tail stock 80. As an example, three forming rollers 82 are rotatably disposed around the mandrel 78 and the tail stock 80.

In this forming apparatus, after the forming rollers 82 are moved radially inward in the direction of the arrow C, as shown in FIG. 7, while the mandrel 78 and the tail stock 80 are rotated in the direction of the arrow D, as shown in FIG. 8, the mandrel 78 is moved in the direction of the arrow E and the forming rollers 82 are rotated in the direction of the arrows F while being pushed onto the blank 81.

As a result, the blank 81 is pushed onto the mandrel 78 and deformed into the shape of a cup. At this time, some of the blank 81 enters the tooth die part 79 and the first and second spline teeth 73, 74 and the first and second spline grooves 75, 76 are integrally formed and the grooves 74a are formed in the second spline teeth 74.

Thus, working man-hours for cutting and deburring machining and so on can be reduced and it is possible to lower the cost of the drum 70.

Also, simultaneously with the first and second spline teeth 73, 74 and the first and second spline grooves 75, 76 being formed, the braking surface 70a for the band 62 (see FIG. 3)

to be applied to is formed. Consequently, it is possible to reduce the number of parts required as well as reducing working man-hours and cost for the drum 70 still further.

A second preferred embodiment of the invention will now be described.

Figure 9:
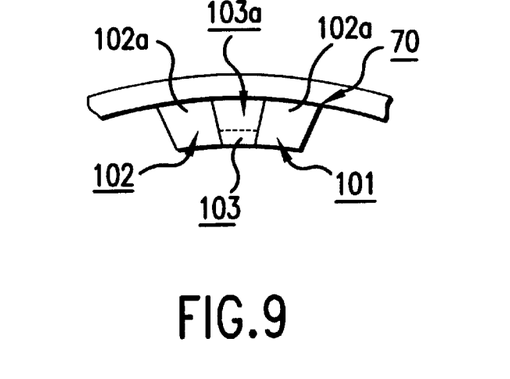
FIG. 9 is sectional view of a representative part of an internally toothed drum according to a second preferred embodiment of the invention.
Figure 10:
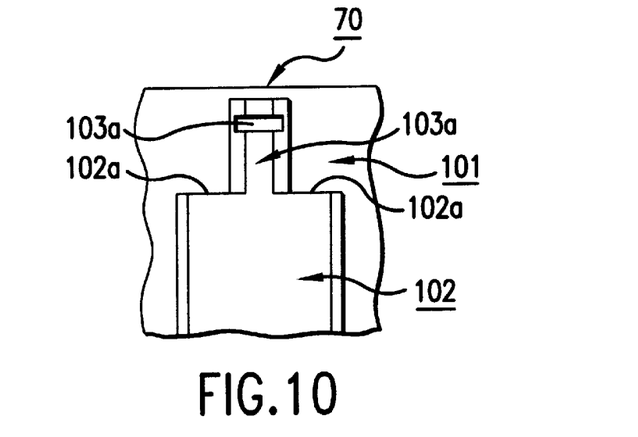
FIG. 10 is a front view of a spline tooth in the second preferred embodiment.
Figure 11:
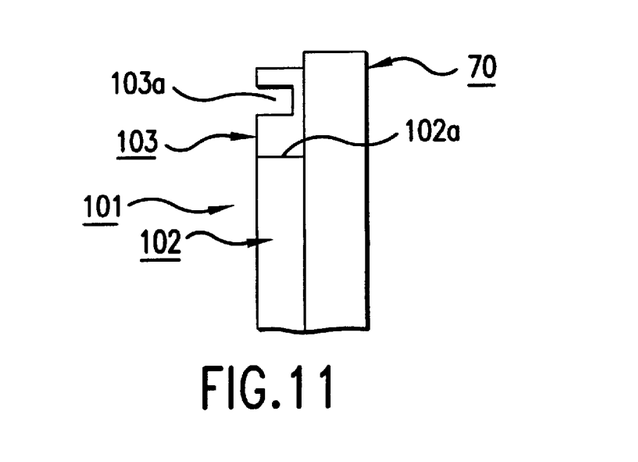
FIG. 11 is a longitudinal section of the tooth shown in FIG. 10.

FIG. 9 is a cross section through a representative part of a drum having a spline tooth in a second preferred embodiment of the invention. FIG. 10 is a front view of a spline tooth in the second preferred embodiment. FIG. 11 is a longitudinal section of the same part of the drum.

In the figures, the reference number 70 denotes a drum, and on the inner circumferential surface of this drum 70 in a plurality of locations spaced in the circumferential direction are formed spline teeth 101 extending in the axial direction. Spline teeth 101 include integrally formed first spline teeth 102 as first internal teeth extending in the axial direction to interlock the outer peripheries of the outer side thin plates 22 (FIG. 1) with the drum 70. Spline teeth 101 also include second spline teeth 103 as second internal teeth extending in the axial direction and projecting toward the open end of the drum from the centers of the end faces 102a of the first spline teeth 102 to interlock the outer periphery of the flange 19 with the drum 70.

Also, a groove 103a for receiving a snap ring 33 is formed in the second spline teeth 103.

Therefore, the front end face of the flange 19 and the rear end face of the snap ring 33 are made to abut such that movement of the flange 19 upward in FIG. 10 and FIG. 11 is thereby limited. The rear end face of the flange 19 and the end faces (the upper end faces in FIG. 10 and FIG. 11) 102a of the first spline teeth 102 are made to abut such that movement of the flange 19 downward in FIG. 10 and FIG. 11 is thereby limited.

A third preferred embodiment of the invention will now be described.

Figure 12:
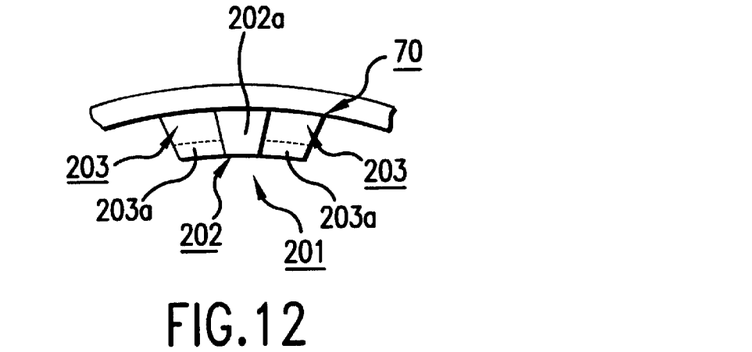
FIG. 12 is a sectional view of a representative part of an internally toothed drum according to a third preferred embodiment of the invention.
Figure 13:
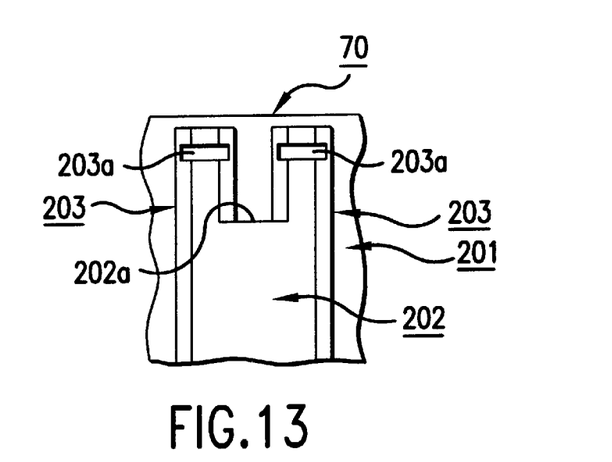
FIG. 13 is a front view of a spline tooth in the third preferred embodiment.

FIG. 12 is a cross section of a representative part of a drum having internal spline teeth in a third preferred embodiment of the invention. FIG. 13 is a front view of a spline tooth in the third preferred embodiment and FIG. 14 is a longitudinal section of the same part of the drum.

In the figures, the reference number 70 denotes a drum, and axially extending spline teeth 201 are formed on the inner circumferential surface of this drum 70 in a plurality of locations spaced in the circumferential direction. Spline teeth 201 are integrally formed with first spline teeth 202 extending in the axial direction to interlock the outer peripheries of the outer side thin plates 22 (FIG. 1) with the drum 70. Additionally, a pair of second spline teeth 203 are formed extending in the axial direction and projecting toward the open end of the drum from the sides of the end faces 202a of each of the first spline teeth 202 to interlock the outer periphery of the flange 19 with the drum 70.

Also, a groove 203a for receiving a snap ring 33 is formed in the second spline teeth 203.

Figure 14:
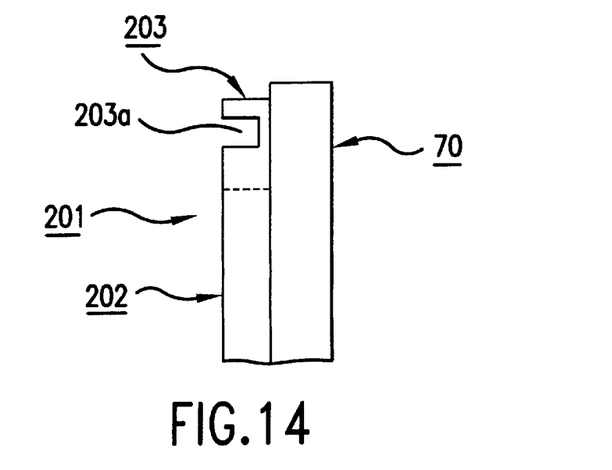
FIG. 14 is a longitudinal section of the tooth shown in FIG. 13.

Therefore, the front end face of the flange 19 and the rear end face of the snap ring 33 are made to abut such that movement of the flange 19 upward in FIG. 13 and FIG. 14 is thereby limited. The rear end face of the flange 19 and the end faces (the upper end faces in FIG. 13 and FIG. 14) 202a of the first spline teeth 202 are made to abut such that movement of the flange 19 downward in FIG. 13 and FIG. 14 is thereby limited.

A fourth preferred embodiment of the invention will now be described.

Figure 15:
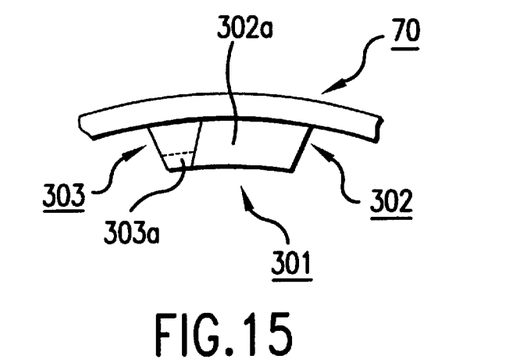
FIG. 15 is a sectional view of a representative part of an internally toothed drum according to a fourth preferred embodiment of the invention.
Figure 16:
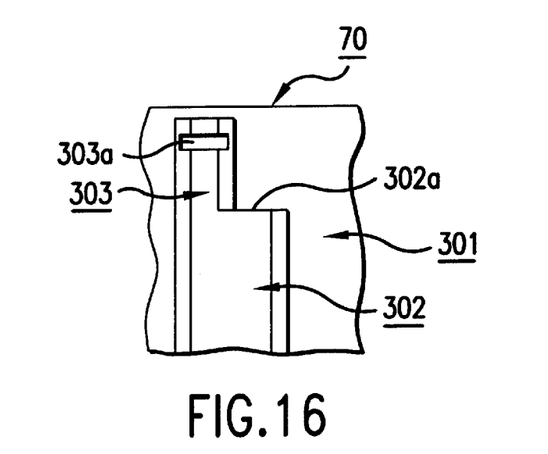
FIG. 16 is a front view of a spline tooth in the fourth preferred embodiment.

FIG. 15 is a cross section of a representative part of a drum having internal spline teeth in a fourth preferred embodiment of the invention. FIG. 16 is a front view of a spline tooth in this fourth preferred embodiment and FIG. 17 is a longitudinal section of the same part of the drum.

In the figures, the reference number 70 denotes a drum, and axially extending spline teeth 301 are formed on the inner circumferential surface of this drum 70 in a plurality of locations spaced in the circumferential direction. Spline teeth 301 are each formed integrally with a first spline tooth 302 extending in the axial direction to interlock the outer peripheries of the outer side thin plates 22 (FIG. 1) with the drum 70. Additionally, second spline tooth 303 is an integral part of each spline tooth 301, extending in the axial direction and projecting toward the open end of the drum from one side of the end face 302a of the first spline tooth 302 to interlock the outer periphery of the flange 19 with the drum 70.

Also, a groove 303a for receiving a snap ring 33 is formed in the second spline teeth 303.

Figure 17:
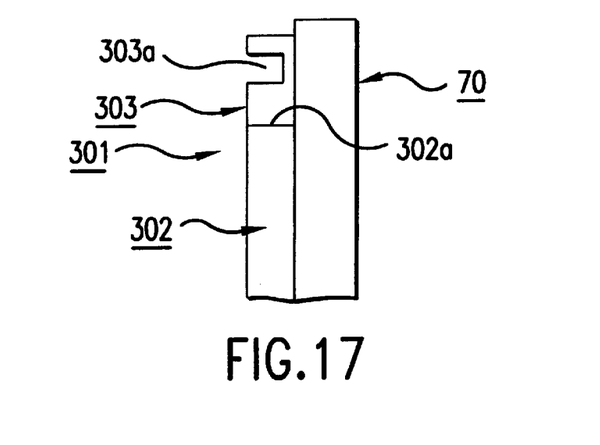
FIG. 17 is a longitudinal section of the tooth shown in FIG. 16.

Therefore, the front end face of the flange 19 and the rear end face of the snap ring 33 are made to abut such that movement of the flange 19 upward in FIG. 16 and FIG. 17 is thereby limited. The rear end face of the flange 19 and the end faces (the upper end faces in FIG. 16 and FIG. 17) 302a of the first spline teeth 302 are made to abut such that movement of the flange 19 downward in FIG. 16 and FIG. 17 is thereby limited.

A fifth preferred embodiment of the invention will now be described.

Figure 18:
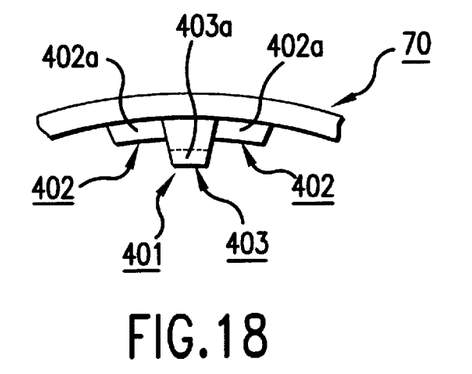
FIG. 18 is a sectional view of a representative part of an internally toothed drum according to a fifth preferred embodiment of the invention.
Figure 19:
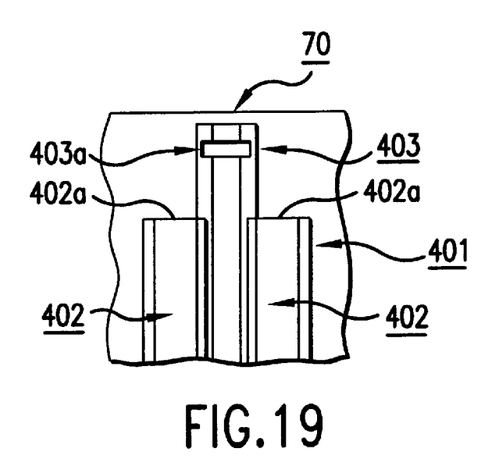
FIG. 19 is a front view of a spline tooth in the fifth preferred embodiment.

FIG. 18 is a cross section of a representative part of a drum having internal spline teeth according to a fifth preferred embodiment of the invention. FIG. 19 is a front view of a spline tooth in this fifth preferred embodiment and FIG. 20 is a longitudinal section of the same part of the drum.

In the figures, the reference number 70 denotes a drum, and axially extending spline teeth 401 are formed on the inner circumferential surface of the drum 70 in a plurality of locations spaced in the circumferential direction. Spline teeth 401 are integrally formed with first spline teeth 402 as first internal teeth extending in the axial direction to interlock the outer peripheries of the outer side thin plates 22 (FIG. 1) with the drum 70. Second spline teeth 403 are also formed as part of spline teeth 401 extending in the axial direction and projecting toward the open end of the drum from between the first spline teeth 402 to interlock the outer periphery of the flange 19 with the drum 70.

Also, a groove 403a for receiving a snap ring 33 is formed in the second spline teeth 403. The second spline teeth 403 are made higher than the first spline teeth 402.

Figure 20:
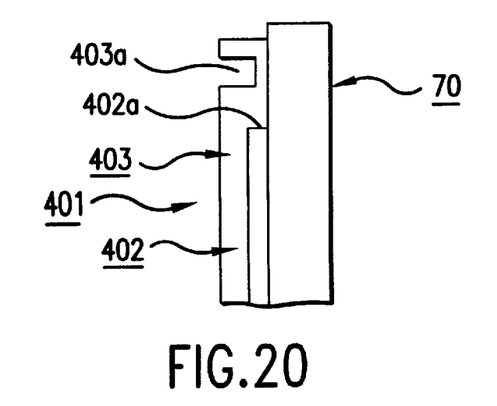
FIG. 20 is a longitudinal section of the tooth shown in FIG. 19.

Therefore, the front end face of the flange 19 and the rear end face of the snap ring 33 are made to abut such that movement of the flange 19 upward in FIG. 19 and FIG. 20 is thereby limited. The rear end face of the flange 19 and the end faces (the upper end faces in FIG. 19 and FIG. 20) 402a of the first spline teeth 402 are made to abut and movement of the flange 19 downward in FIG. 19 and FIG. 20 is thereby limited.

A sixth preferred embodiment of the invention will now be described.

Figure 21:
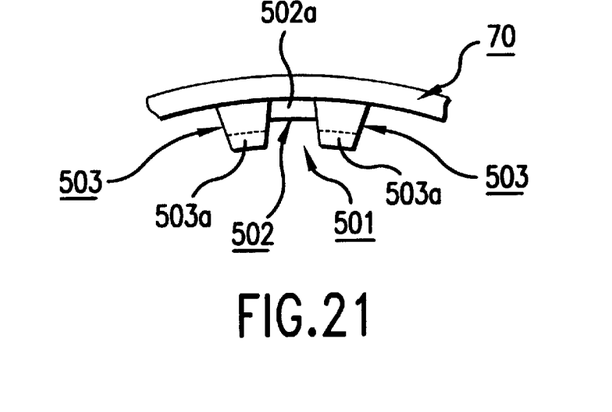
FIG. 21 is a sectional view of a representative part of an internally toothed drum according to a sixth preferred embodiment of the invention.
Figure 22:
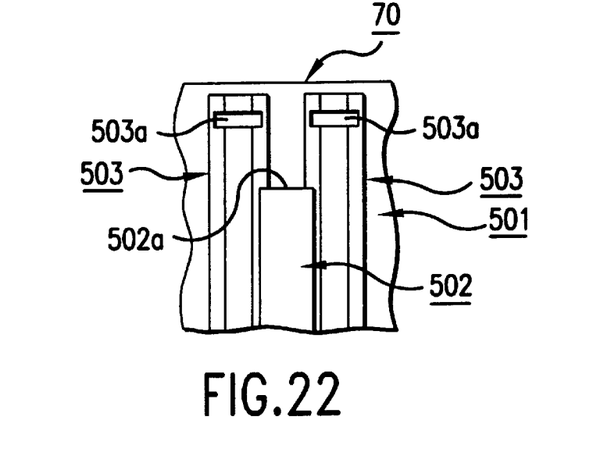
FIG. 22 is a front view of a spline tooth in the sixth preferred embodiment.

FIG. 21 is a cross section of a representative part of a drum having internal spline teeth according to a sixth preferred embodiment of the invention. FIG. 22 is a front view of a spline tooth in this sixth preferred embodiment and FIG. 23 is a longitudinal section of the same part of the drum.

In the figures, the reference number 70 denotes a drum, and axially extending spline teeth 501 are formed on the inner circumferential surface of this drum 70 in a plurality of locations spaced in the circumferential direction. Spline teeth 501 are integrally formed with first spline teeth 502 as first internal teeth extending in the axial direction to interlock the outer peripheries of the outer side thin plates 22 (FIG. 1) with the drum 70, and second spline teeth 503 as second internal teeth extending in the axial direction and projecting toward the open end of the drum from the sides of the first spline teeth 502 to interlock the outer periphery of the flange 19 with the drum 70.

Also, a groove 503a for receiving a snap ring 33 is formed in the second spline teeth 503. The second spline teeth 503 are made higher than the first spline teeth 502.

Figure 23:
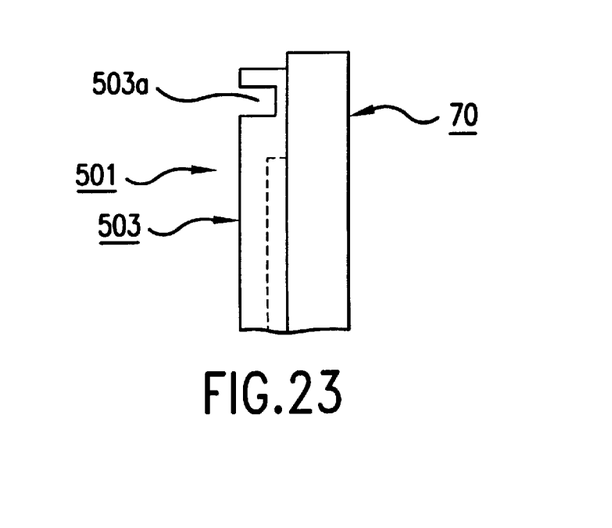
FIG. 23 is a longitudinal section of the tooth shown in FIG. 22.

Therefore, the front end face of the flange 19 and the rear end face of the snap ring 33 are made to abut such that movement of the flange 19 upward in FIG. 22 and FIG. 23 is thereby limited. The rear end face of the flange 19 and the end faces (the upper end faces in FIG. 22 and FIG. 23) 502a of the first spline teeth 502 are made to abut such that movement of the flange 19 downward in FIG. 22 and FIG. 23 is thereby limited.

A seventh preferred embodiment of the invention will now be described.

Figure 24:
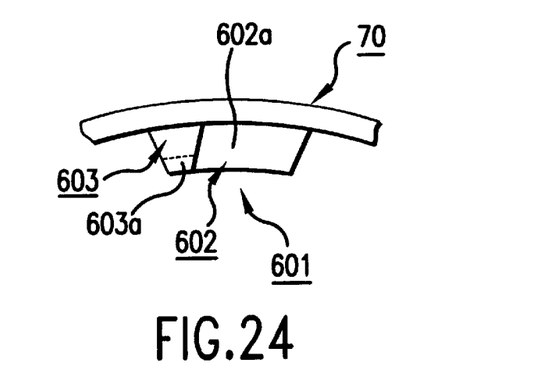
FIG. 24 is a sectional view of a representative part of an internally toothed drum according to a seventh preferred embodiment of the invention.
Figure 25:
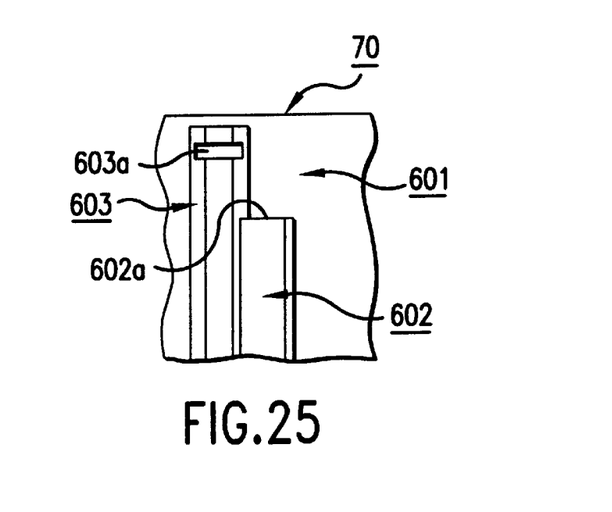
FIG. 25 is a front view of a spline tooth in the seventh preferred embodiment.

FIG. 24 is a cross section of a representative part of a drum having internal spline teeth in a seventh preferred embodiment of the invention. FIG. 25 is a front view of a spline tooth in this seventh preferred embodiment and FIG. 26 is a longitudinal section of the same part of the drum.

In the figures, the reference number 70 denotes a drum, and axially extending spline teeth 601 are formed on the inner circumferential surface of this drum 70 in a plurality of locations spaced in the circumferential direction. Spline teeth 601 are integrally formed with first spline teeth 602 as first internal teeth extending in the axial direction to interlock the outer peripheries of the outer side thin plates 22 (FIG. 1) with the drum 70, and second spline teeth 603 as second internal teeth each extending in the axial direction and projecting toward the open end of the drum from one side of the respective first spline tooth 602 to interlock the outer periphery of the flange 19 with the drum 70.

Also, a groove 603a for receiving a snap ring 33 is formed in the second spline teeth 603. The second spline teeth 603 are made higher than the first spline teeth 602.

Figure 26:
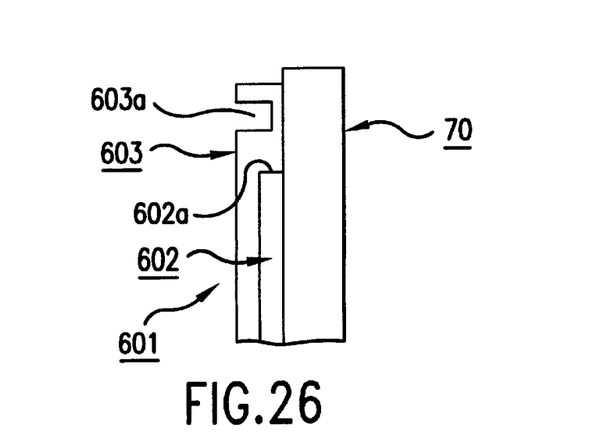
FIG. 26 is a longitudinal section of the tooth shown in FIG. 25.

Therefore, the front end face of the flange 19 and the rear end face of the snap ring 33 are made to abut such that movement of the flange 19 upward in FIG. 25 and FIG. 26 is thereby limited. The rear end face of the flange 19 and the end faces (the upper end faces in FIG. 25 and FIG. 26) 602a of the first spline teeth 602 are made to abut such that movement of the flange 19 downward in FIG. 25 and FIG. 26 is thereby limited.

The invention is not limited to the preferred embodiments described above, and various modifications are possible on the basis of the teachings of the invention within the spirit and the scope of the invention.

As described above in detail, an internally toothed member according to the invention has the shape of a cup with first and second axially extending internal spline teeth. The first internal teeth extend in the axial direction and the second internal teeth extend axially further toward the open end of the member than the end of the first internal teeth. The internal spline teeth are formed on the inner circumferential surface of the member in each of a plurality of locations spaced in the circumferential direction.

Also, a groove for receiving a snap ring is formed in the second internal teeth on the open end side of the ends of the first internal teeth that face the open end.

In this case, because the first and second internal teeth are formed projecting radially inward, they do not lower the rigidity of the internally toothed member.

Also, because it is not necessary to fix a cylindrical member to the outside of the internally toothed member for reinforcement, working man-hours can be reduced and it is possible to lower the cost of the internally toothed member.

Furthermore, because movement of the flange, which is splined with the sun gear of a planetary unit, is limited by the end faces of the first internal teeth and the snap ring, it is only necessary to provide one snap ring and form one groove in the inner circumferential surfaces of the second internal teeth for the single snap ring. Therefore, the present invention makes it possible to further reduce the number of parts, the man-hours required to produce the finished internally toothed drum and the cost of the drum.

In another internally toothed member according to the invention, a braking surface for a band brake to be applied to is formed on the outer circumferential surface of the internally toothed member. In this case, because the braking surface for a band brake is formed simultaneously with the forming of the first and second internal teeth, further reductions in the number of parts, the manufacturing man-hours and the cost of the internally toothed member are achieved.

In a method for forming an internally toothed member according to the invention, a blank or work piece of the desired material is fixed to the end of a mandrel and the blank is deformed into a cup shape by being pushed onto a tooth die part of the mandrel with forming rollers while the mandrel is rotated.

The cup-shaped drum formed by the process of the present invention includes first and second axially extending internal teeth. The first axially extending internal teeth are formed at each of a plurality of locations spaced in the circumferential direction on the inner circumferential surface of the drum, and the second axially extending internal teeth project further toward the open end of the cup-shaped drum than the ends of the first internal teeth that face the open end.

Also, a groove for receiving a snap ring is formed in the second internal teeth on the open end side of the ends of the first internal teeth. In this case, the first and second internal teeth are formed integrally and the groove is formed in the second internal teeth as the blank is deformed into the shape of a cup by the forming rollers.

Therefore, the method of the present invention makes it is possible to reduce man-hours for cutting and deburring of the internal teeth, as required with conventional manufacturing methods for clutch drums, thus lowering the cost of the internally toothed member.

An apparatus for forming an internally toothed member according to the invention has a mandrel, fixing means for fixing a blank to the end of the mandrel, and forming rollers for pushing the blank onto a tooth die part of the mandrel and thereby deforming it into the shape of a cup.

The outer circumferential surface of the tooth die part of the mandrel is formed with a plurality of circumferentially spaced concavities corresponding to the desired positions for internal teeth on the drum. Concavities corresponding to the first internal teeth extend in the axial direction and concavities corresponding to the second internal teeth extend in the axial direction and project further toward the open end of the drum than the ends of the first internal teeth.

In this case, when the blank is fixed to the end of mandrel with the fixing means and deformed into a cup shape by being pushed onto the tooth die part of the mandrel by the forming rollers, the first and second internal teeth are integrally formed on the inner circumferential surface of the blank and a groove is formed in the second internal teeth.

Therefore, working man-hours for cutting and deburring are reduced along with the cost for manufacturing the internally toothed member.

What is claimed is:

1. An internally toothed member having the shape of a cup with a central axis, a wall, an inner circumferential surface, an outer circumferential surface, and an open end;

a plurality of first internal teeth extending from the wall side toward the open end in an axial direction substantially parallel to the central axis and being formed on the inner circumferential surface in circumferentially spaced locations with end faces of the first internal teeth facing the open end;

a plurality of second internal teeth extending from the wall side toward the open end in the axial direction and being formed on the inner circumferential surface in circumferentially spaced locations, with the second internal teeth extending further toward the open end than the first internal teeth; and a groove for receiving a snap ring being formed in the second internal teeth closer to the open end than the end faces of the first internal teeth.

2. The internally toothed member according to claim 1, wherein a braking surface for application of a band brake is formed on the outer circumferential surface.

3. An internally toothed member made from a blank by fixing said blank to the end of a mandrel and by pushing the blank onto a tooth die part of the mandrel using a reforming roller while rotating the mandrel, thus deforming the blank into the shape of a cup having a central axis, an inner circumferential surface, an outer circumferential surface, and an open end;

a plurality of first internal teeth being formed by said tooth die part of said mandrel to extend from the end of said mandrel side toward said open end in an axial direction substantially parallel to said central axis and being formed on the inner circumferential surface in circumferentially spaced locations with end faces of said first internal teeth facing said open end;

a plurality of second internal teeth being formed by said tooth die part of said mandrel to extend from the end of said mandrel side toward said open end in the axial direction and being formed on the inner circumferential surface in circumferentially spaced locations, with said second internal teeth extending further toward the open end than said first internal teeth; and a groove for receiving a snap ring being worked in the second internal teeth closer to the open end than said end faces of the first internal teeth.

4. The internally toothed member according to claim 3, wherein a braking surface for application of a band brake is formed on the outer circumferential surface.

5. A method for forming an internally toothed member, comprising the steps of:

fixing a blank to the end of a mandrel;

pushing the blank onto a tooth die part of the mandrel while rotating the mandrel to deform the blank into the shape of a cup with a central axis, an inner circumferential surface, an outer circumferential surface and an open end and forming on the inner circumferential surface of the cup-shaped blank in each of a plurality of circumferentially spaced locations a first internal tooth extending from the end of said mandrel side toward said open end in an axial direction substantially parallel to the central axis and having an end face facing the open end and a second internal tooth extending from the end of said mandrel side toward said open end in the axial direction and projecting further toward the open end than the first internal tooth and forming a groove for fitting a snap ring in the second internal teeth closer to the open end than the end faces of the first internal teeth.

6. An apparatus for forming an internally toothed member from a blank, said apparatus comprising:

a mandrel;

fixing means for fixing the blank to an end of said mandrel;

a forming roller for deforming the blank into the shape of a cup having a central axis, an inner circumferential surface, an outer circumferential surface and an open end by pushing the blank onto said mandrel;

said mandrel having a tooth die portion adjacent said end of said mandrel, wherein said tooth die portion has formed therein in each of a plurality of circumferentially spaced locations on an outer circumferential surface of the mandrel a first concavity for forming on said inner circumferential surface a first internal tooth extending from the end of said mandrel side toward said open end in an axial direction substantially parallel to said central axis and a second concavity for forming on said inner circumferential surface a second internal tooth extending from the end of said mandrel side toward said open end in the axial direction further toward the open end than the first internal tooth.

\* \* \* \* \*